United States Patent
Chen et al.

(10) Patent No.: US 10,704,385 B2
(45) Date of Patent: Jul. 7, 2020

(54) MODELLING ELECTROMAGNETIC TELEMETRY SIGNALS IN DEVIATED WELLS

(71) Applicant: Schlumberger Technology Corporation, Sugar Land, TX (US)

(72) Inventors: Jiuping Chen, San Pablo, CA (US); Gaelle Jannin, Houston, TX (US); Liang Sun, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 16/251,120

(22) Filed: Jan. 18, 2019

(65) Prior Publication Data

US 2019/0226328 A1    Jul. 25, 2019

Related U.S. Application Data

(60) Provisional application No. 62/619,184, filed on Jan. 19, 2018.

(51) Int. Cl.
| | |
|---|---|
| *E21B 47/12* | (2012.01) |
| *G01V 3/30* | (2006.01) |
| *G01V 3/12* | (2006.01) |
| *G01V 3/02* | (2006.01) |

(Continued)

(52) U.S. Cl.
CPC .............. *E21B 47/122* (2013.01); *E21B 7/10* (2013.01); *G01V 3/02* (2013.01); *G01V 3/12* (2013.01); *G01V 3/30* (2013.01); *H04B 17/391* (2015.01); *H04B 17/3912* (2015.01)

(58) Field of Classification Search
CPC ........ E21B 47/122; E21B 7/10; H04B 17/391; H04B 17/3912; H04B 17/3913; G01V 3/02; G01V 3/12; G01V 3/30
See application file for complete search history.

(56) References Cited

U.S. PATENT DOCUMENTS

| 5,942,990 A | * | 8/1999 | Smith | ............... E21B 47/122 340/853.7 |
|---|---|---|---|---|
| 2016/0061027 A1 | | 3/2016 | Gao et al. | |

FOREIGN PATENT DOCUMENTS

WO     WO-2019017957 A1 *  1/2019  ............. E21B 47/00

OTHER PUBLICATIONS

Bhagwan et al., Electric drill stem telemetry; IEEE Trans. on Geoscience and Remote Sensing, IEEE Transaction on Goescience and Remote Sensing, vol. GE-20, No. 2, Apr. 1982, pp. 193-197.
DeGauque et al., Propagation of electromagnetic waves along a drillstring of finite conductivity, SPE Drilling Engineering, Jun. 1987, pp. 127-134.

(Continued)

*Primary Examiner* — Franklin D Balseca

(57) ABSTRACT

A method for modeling an electromagnetic (EM) telemetry signal includes straightening a well in a model and dividing the well into a plurality of segments. The method also includes determining an electrical current in one or more of the segments when the well is straightened. The method also includes replacing the well with equivalent electrical sources based at least partially upon the electrical current in one or more of the segments. The method also includes bending the well back into its original shape in the model and determining the electrical current in one or more of the segments by projection when the well is back in its original shape. The method also includes summing EM fields for each of the one or more segments to estimate the EM telemetry signal.

20 Claims, 14 Drawing Sheets

(51) Int. Cl.
    *E21B 7/10*         (2006.01)
    *H04B 17/391*    (2015.01)

(56)             References Cited

OTHER PUBLICATIONS

Li et al., Wireless transmission of MWD and LWD signal based on guidance of metal pipes and relay of transceivers, IEEE Transaction on Goescience and Remote Sensing, vol. 54, No. 8, Aug. 2016, pp. 4855-4866.

Trofimenkoff et al., Characterization of EM downhole-to-surface communication links, IEEE Transactions on Geoscience and Remote Sensing vol. 38, No. 6, Nov. 2000, pp. 2539-2548.

Xia et al., Attenuation prediction at extremely low frequencies for measurement-while-drilling electromagnetic telemetry system, IEEE Transactions on Geoscience and Remote Sensing vol. 31, No. 6, Nov. 1993, pp. 1222-1228.

Cuevas, N.H., Analytical solutions to dipolar EM sources inside infinite metallic casing, SEG Annual Meeting, Houston, Texas, 2013, 5 pages.

Kaufman, A.A., The electrical field in the a borehole with a casing, Geophysics, vol. 55, No. 1, Jan. 1990, pp. 29-48.

Kong et al., Casing effects in the sea-to-borehole electromagnetic method, Geophysics, vol. 74, No. 5, Sep.-Oct. 2009, pp. F77-F87.

Schenkel et al., Effects of well casing on potential field measurements using downhole current sources, Gepphysical Prospecting, vol. 38, 1990, pp. 663-686.

Wu et al., Influence of steel casings on electromagnetic signals, Geophysics, vol. 59, No. 3, Mar. 1994, pp. 378-390.

Um et al., Finite element modeling of transient EM fields near steel-cased wells, Geophysical Journal International, vol. 202, 2015, pp. 901-913.

\* cited by examiner

MODELLING ELECTROMAGNETIC TELEMETRY SIGNALS IN DEVIATED WELLS

CROSS-REFERENCE TO RELATED APPLICATIONS

This application claims priority to U.S. Provisional Patent Application No. 62/619,184, filed on Jan. 19, 2018, which is hereby incorporated by reference in its entirety.

BACKGROUND

Electromagnetic (EM) telemetry is an example of a communication tool for transmitting drilling mechanics and formation evaluation information uphole, in real-time, from a measurement-while-drilling (MWD) and/or logging-while-drilling (LWD) tool. When compared to conventional mud pulse telemetry, EM telemetry provides higher data transmission rates, better tolerances of lost circulation material (LCM), and rig-independent EM-downlinking. Consequently, it achieves reduced rig-time and lower costs of service delivery.

An uplink EM signal can be collected by at least two stakes on the surface. A blow-out preventer (BOP) can be used as one of the two stakes. Oftentimes, the EM signal may be attenuated (e.g., due to a conductive formation, water-based mud (WBM), and/or noises present at the rig site). Due to this attenuation, it may be difficult to detect a small/weak EM signal. This can make it difficult to decode the information sent out from the gap source in the transmitter, which can include the wide use of EM telemetry.

One solution is to use a steel-cased deep-electrode (DE) well adjacent to the drilling well to measure the signal. Through field tests, it has been confirmed that using deep electrodes as receivers has made it possible to decode EM telemetry signals until its touchdown (TD), e.g., 28,000 ft. However, a challenge with EM telemetry still exists with regard to predicting a real job EM signal knowing some information about the drilling well, DE well, as well as resistivity distribution of the formation. This can be a pre-job 3D EM modeling problem.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for modeling an electromagnetic (EM) telemetry signal is disclosed. The method includes straightening a well in a model. The method also includes dividing the well into a plurality of segments. The method also includes determining an electrical current in one or more of the segments when the well is straightened. The method also includes replacing the well with equivalent electrical sources based at least partially upon the electrical current in one or more of the segments. The method also includes bending the well back into its original shape in the model. The method also includes determining the electrical current in one or more of the segments by projection when the well is back in its original shape. The method also includes summing EM fields for each of the one or more segments, based at least partially upon the electrical current in the one or more segments when the well is back in its original shape, to estimate the EM telemetry signal.

In another embodiment, the method includes replacing a first well with equivalent electrical sources in a model. The method also includes determining an electrical current in one or more segments in the first well based at least partially upon the equivalent electrical sources. The method also includes generating a simulated electrical current in the second well. The method also includes determining a normalized voltage in the one or more segments in the first well in response to the simulated electrical current. The method also includes determining a segment voltage in the one or more segments based at least partially upon the electrical current and the normalized voltage. The method also includes estimating the EM telemetry signal based at least partially upon the segment voltages of the one or more segments in the first well.

A computing system is also disclosed. The computing system includes one or more processors and a memory system. The memory system includes one or more non-transitory computer-readable media storing instructions that, when executed by at least one of the one or more processors, cause the computing system to perform operations. The operations include replacing a first well with equivalent electrical sources in a model. The operations also include determining an electrical current in one or more segments in the first well based at least partially upon the equivalent electrical sources. The operations also include generating a simulated electrical current in the second well. The operations also include determining a normalized voltage in the one or more segments in the first well in response to the simulated electrical current. The operations also include determining a segment voltage in the one or more segments based at least partially upon the electrical current and the normalized voltage. The operations also include estimating the EM telemetry signal based at least partially upon the segment voltages of the one or more segments in the first well.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1B:
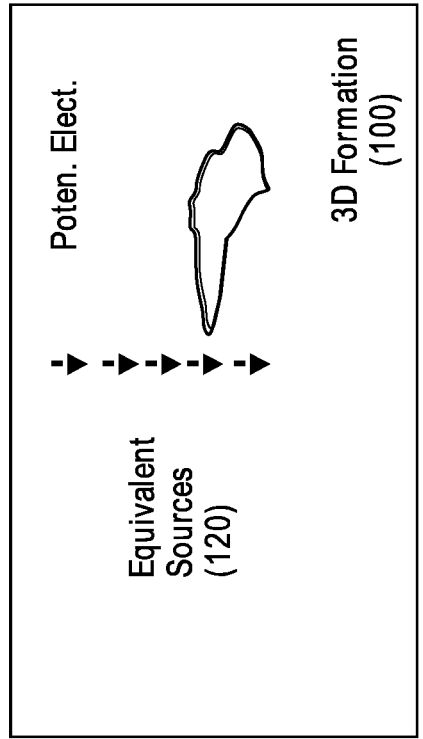
FIG. 1B illustrates a schematic view of the 3D formation with the steel-cased well removed and replaced by one or more equivalent electrical (e.g., current) source(s), according to an embodiment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

From a numerical modeling point of view, using a deep electrode (DE) well adjacent to a drilling well can add one more difficult elements to the existing and challenging task of determining how to analyze another electrically-conductive DE steel-cased well. A challenging part in current 3D EM modeling can be how to deal with the large dynamic 3D model size/cell aspect ratio. For example, the 3D model size may be multiple kilometers in each direction while the outer-diameter (OD) of the drilling well may be less than 30 centimeters, and the resistivity contrast between the drill-string/casings (e.g., $1 \times 10^{-7}$ $\Omega$m) and the host formation (e.g., 1 to 1000 $\Omega$m). With the use of a DE steel-cased well, this may increase the difficulties, making new 3D modeling more difficult.

EM telemetry can be used as a communication tool, carrying and transforming the borehole information acquired near the drill bit to the surface for field engineers to monitor the drilling activities and performance, and make corresponding decisions. As long as the signal is above some noise threshold (e.g., 5 $\mu$V), and the signal can be detected and decoded. The signal may be less accurate than in some geophysical methods in which EM techniques are used as imaging tools. This is an opportunity to use an approximation method for 3D EM telemetry prediction.

This approximation methodology is based upon a physical understanding of the pipe/casing current distributions in both the drilling and the DE wells. Behind this approximation lies at least two ideas: (a) how to replace an electrically-conductive and geometrically-deviated/curved drilling well with equivalent electrical (e.g., current) sources, and (b) how to handle a vertical steel-cased DE well.

Replace 3D Drilling Well with Equivalent Sources

Figure 1A:
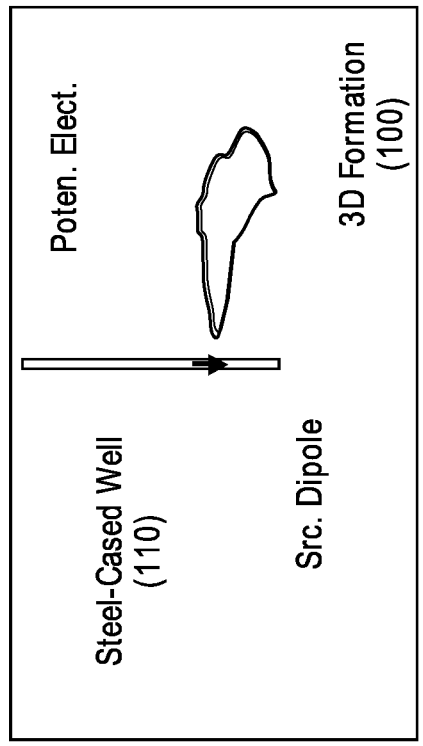
FIG. 1A illustrates a schematic view of a 3D formation with a steel-cased well extending at least partially therethrough, according to an embodiment.

FIG. 1A illustrates a schematic view of a 3D formation 100 with a steel-cased well 110 extending at least partially therethrough, according to an embodiment. FIG. 1B illustrates a schematic view of the 3D formation 100 with the steel-cased well 110 removed and replaced by one or more equivalent electrical (e.g., current) source(s) 120, according to an embodiment. Replacing the steel-cased well 110 with its equivalent electrical (e.g., current) source(s) 120 can simplify the 3D EM telemetry modeling. In one example, the equivalent electrical (e.g., current) source(s) 120 can be electric dipoles. The electric dipoles may have an optimal number and moments that can be obtained by solving an inverse problem. Once these equivalent electrical (e.g., current) sources 120 are found, the physical casing well 110 can disappear or otherwise be removed in the 3D model.

For EM telemetry, a user can apply and extend a similar idea, but implement it in a different way. For example, a 2D axi-symmetric EM modeling code (e.g., CWNLAT) can analyze a well with drill pipe, drilling fluid, casing shoes, as well as a gap source, in a 2D axi-symmetric resistivity formation. This code has been tested against analytical solutions and field tests, and has been stable in pre-job modeling. As such, this code can be used in developing an approximation method.

For a vertical drilling well, a user can directly run the code to obtain the pipe current distributions, and treat each current segment as an equivalent electrical (e.g., current) source. Then, another 1D EM modeling code may be run for each equivalent electrical (e.g., current) source. The equivalent electrical (e.g., current) source responses may be summed, and this may give rise to the signal that the user would like to obtain at any location.

Figure 2:
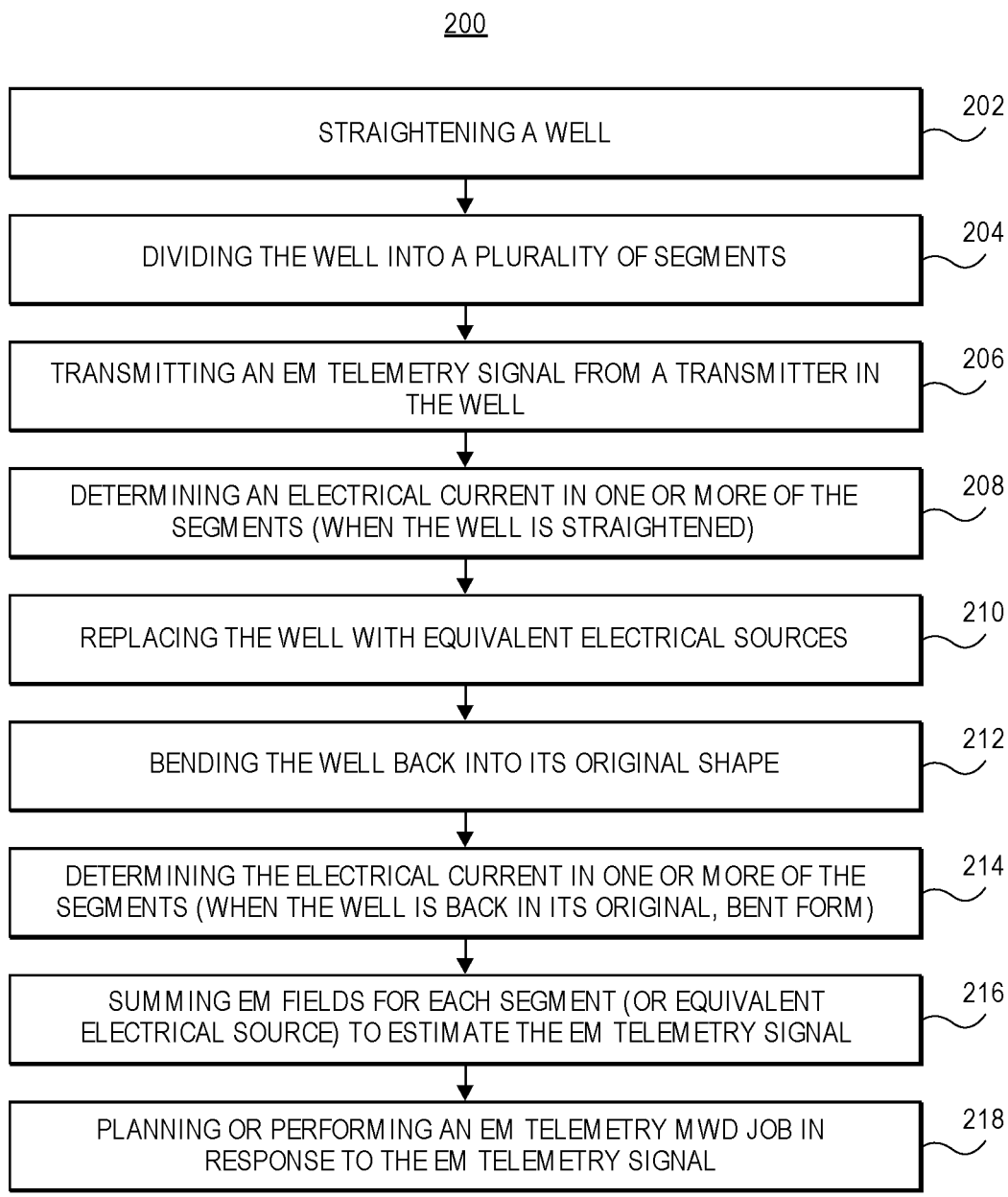
FIG. 2 illustrates a flowchart of a method for predicting an EM signal transmitted from a curved drilling well using equivalent electrical (e.g., current) sources, according to an embodiment.

For a deviated and/or curved well, there can be additional efforts made to use the equivalent electrical (e.g., current) sources. FIG. 2 illustrates a flowchart of a method 200 for measuring an EM signal transmitted from a curved drilling well using equivalent electrical (e.g., current) sources, according to an embodiment. FIGS. 3A-3D may illustrate portions of the method 200.

Figure 3A:
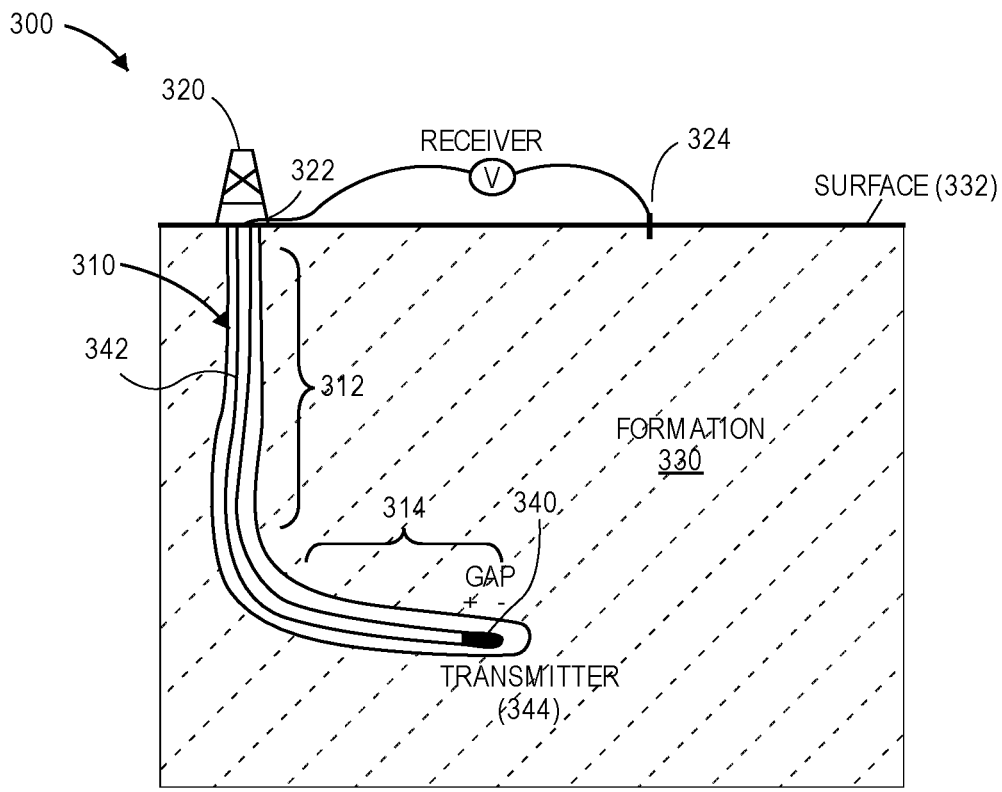
FIG. 3A illustrates a schematic view of a wellsite with a curved well, according to an embodiment.

FIG. 3A illustrates a schematic view of a wellsite 300 with a curved well 310 (e.g., including a first portion 312 and a second portion 314), according to an embodiment. As shown, the first portion 312 is substantially vertical, and the second portion 314 is substantially horizontal. The well 310 may extend downward from a rig 320 into a subterranean formation 330. The rig 320 may be or include a first receiver 322. In one example, the first receiver 322 may be part of a BOP. A second receiver 324 may be positioned at least partially in the ground/surface 332 and laterally-offset from the first receiver 322.

A downhole tool 340 may be positioned within the well 310 (e.g., in the substantially horizontal portion 314). In one example, the downhole tool 340 may be coupled to (e.g., an end of) a metallic drill string (or other tubular string) 342 made up of a plurality of segments. The downhole tool 340 may include an EM transmitter 344 including a gap source. As discussed in greater detail below, the transmitter 344 may transmit EM signals into the formation 330 that may be detected/measured by the receivers 322, 324 at the surface 332.

Figure 3B:
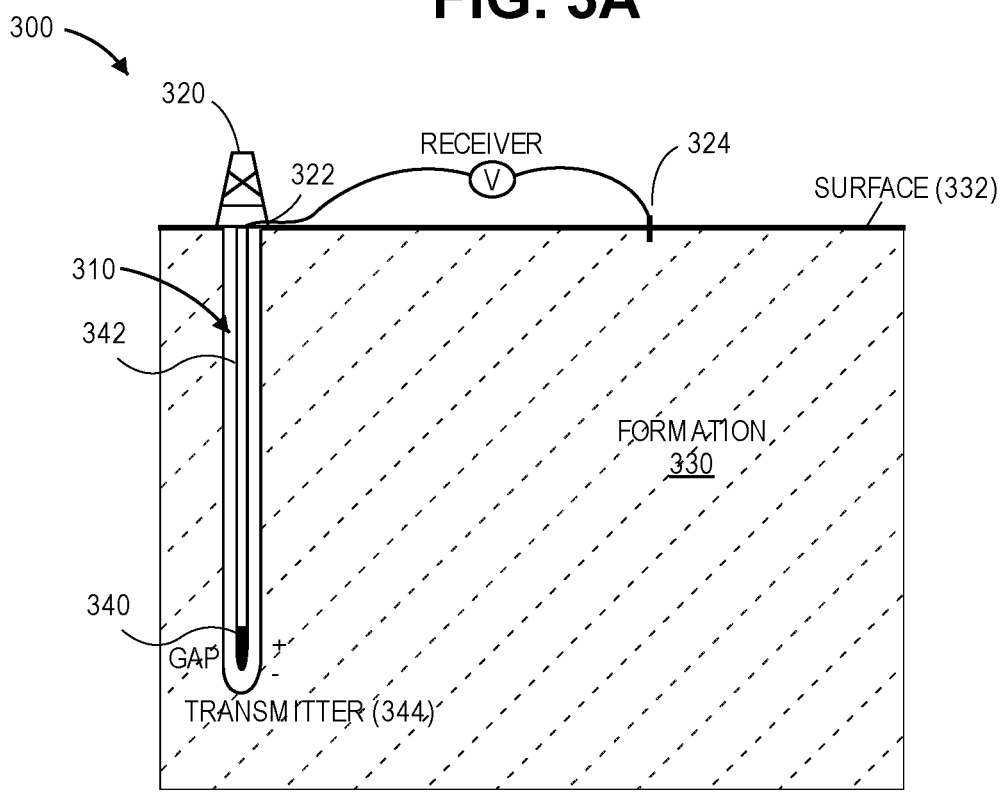
FIG. 3B illustrates a schematic view of the well after being straightened, according to an embodiment.

The method 200 may include straightening the well 310, as at 202. This is shown in FIG. 3B. The well 310 may be straightened in a computer-simulated model; the well is not actually physically straightened in the formation 330. More particularly, the second portion 314 may be modified to be aligned with the first (e.g., substantially vertical) portion 312, such that both portions 312, 314 are substantially vertical, as shown in FIG. 3B. Accordingly, the total length of the well 310 may remain substantially constant during the straightening. Straightening the well 310 may make the analysis an axi-symmetric 2D EM analysis.

Figure 3C:
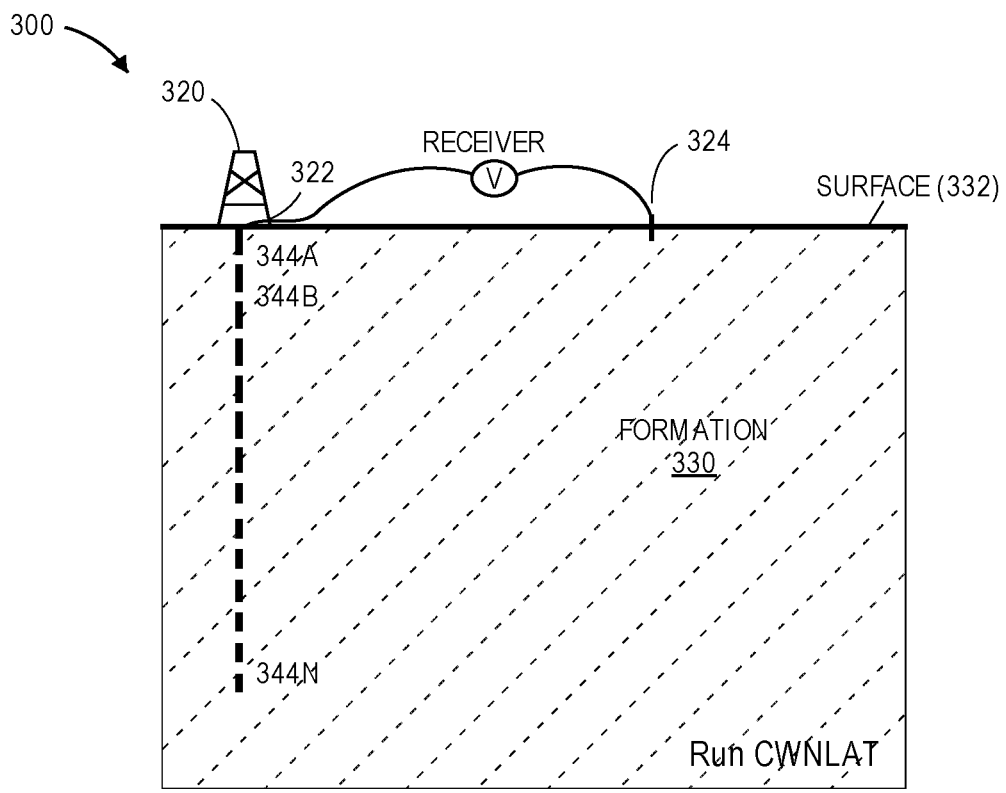
FIG. 3C illustrates a schematic view of the well being replaced with equivalent electrical (e.g., current) sources, according to an embodiment.

In one embodiment, the straightened well may be analyzed using a processor running a code. The code may be a 2D Maxwell equation solver, such as CWNLAT. The method 200 may also include dividing the well 310 into a plurality of segments 344A-344N, as at 204. This is shown in FIG. 3C. The well 310 may be divided using the processor running the code. In at least one embodiment, each segment 344A-344N may correspond to a segment of the drill string 342. However, in other embodiments, the segments 344A-344N may not correspond to segments of the drill string 342.

The method 200 may also include transmitting an EM signal from the transmitter 344, as at 206. The EM signal may generate an electrical current in the well 310 (e.g., in the segments 344A-344N). The electrical current in the well 310 (e.g., in the segments 344A-344N) may depend upon the resistivity of the drill string 342, the formation 330 near the drill string 342, and/or the drilling mud in the well 310.

The method 200 may also include determining the electrical current in one or more (e.g., each of the) segments 344A-344N, as at 208. The electrical current in the segments 344A-344N may be determined using the processor running the code (e.g., CWNLAT).

The electrical current in each segment 344A-344N may be equivalent to an electrical current source from an electromagnetic point of view. As such, once the electrical current in the segments 344A-344N has been determined, the method 200 may also include replacing the well 310 (e.g., the segments 344A-344N) with equivalent electrical (e.g., current) sources, as at 210. The well 310 is replaced with equivalent electrical (e.g., current) sources in a computer-simulated model; the well 310 is not actually physically replaced in the formation 330. As mentioned above, the equivalent electrical (e.g., current) sources may be electric dipoles. In at least one embodiment, one equivalent electrical (e.g., current) source may correspond to one segment (e.g., segment 344A). In another embodiment, a plurality of equivalent electrical (e.g., current) sources may correspond to one segment (e.g., segment 344A). In yet another embodiment, one equivalent electrical (e.g., current) source may correspond to a plurality of segments (e.g., segments 344A and 344B).

Figure 3D:
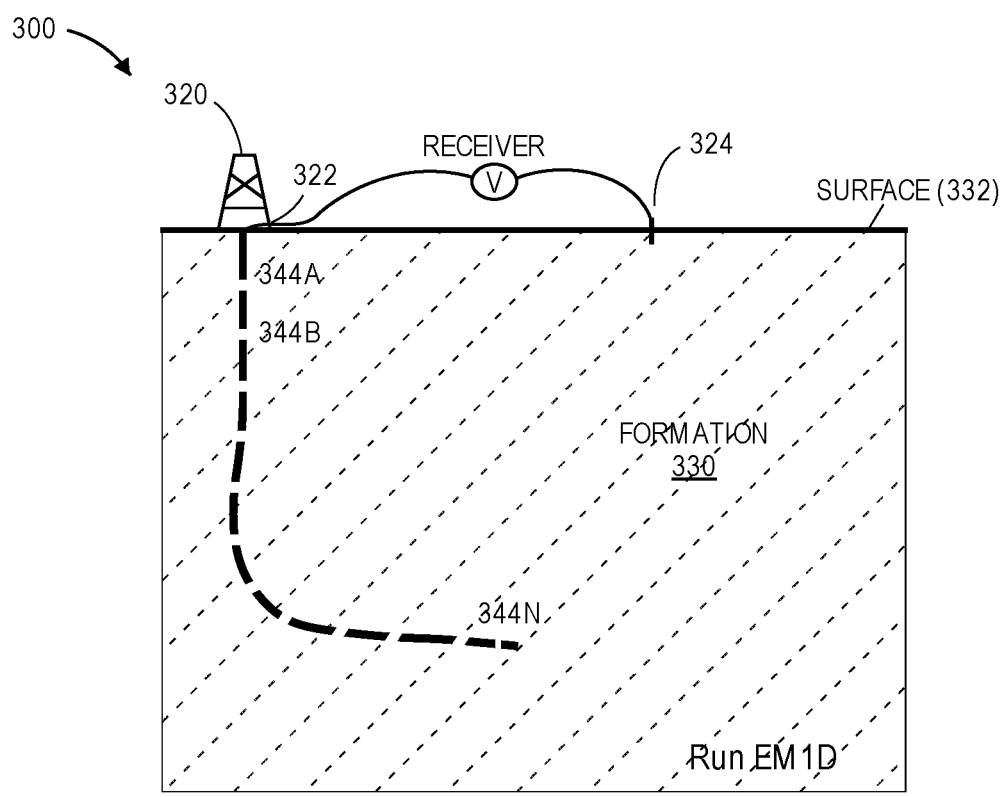
FIG. 3D illustrates a schematic view of the well being bent back into its original, curved form, according to an embodiment.

The method 200 may also include bending the well 310 back into its original shape, as at 212. This is shown in FIG. 3D. The well 310 may be bent in the computer-simulated model; the well 310 is not actually physically bent in the formation 330. Bending the well 310 may include bending the segments 344A-344N and/or the equivalent electrical (e.g., current) sources.

The method 200 may also include determining the electrical current in one or more (e.g., each of the) segments 344A-344N (e.g., after the well 310 is bent back into its original shape), as at 214. The electrical current in the segments 344A-344N may be determined by projection. More particularly, the segment currents calculated/determined (at 208) for the straightened well 310 may be vertical (see FIGS. 3B and 3C). The strength of the electrical currents may be calculated/determined using the processor running the code (e.g., CWNLAT). In the original well 310 (see FIGS. 3A and 3D), one or more of the segments 344A-344N may be bent and/or not vertical. Using the calculated/determined total current strength (from 208 and/or 210), and the known azimuthal and/or inclination angles for each segment 344A-344N (from the drilling well trajectory data), the total electrical current can be projected (or decomposed) into X, Y, and/or Z directions. This means that each segment 344A-344N can be represented by X, Y, and/or Z-oriented electric dipole sources.

The method 200 may also include adding/summing EM fields for each electrical current segment (or equivalent source) to estimate the EM telemetry signal, as at 216. More particularly, this may estimate the amplitude of the EM telemetry signal at one or more of the receivers 322, 324. The EM fields may be obtained by summation of the field produced by each equivalent source (e.g., at 214) through running another EM 1D modeling code.

The method 200 may also include planning or performing an EM telemetry measurement-while-drilling (MWD) job in response to the EM telemetry signal, as at 218. The MWD job may be or include the act of drilling the well 310, varying a trajectory of the well 310, varying a weight-on-bit, varying a fluid being pumped into the well, 310, or a combination thereof. The EM telemetry signal may also be used for pre-job applications and/or on-site support of a MWD job. For pre-job applications, a user may decide if EM telemetry is workable or not for a specific formation with the conditions such as carrier frequencies, drilling fluid mud, drilling depth (MD), and signal reception (surface stakes or deep electrode). For on-site support of WMD job, the physical action from the modeling may include, for example, changing the carrier frequency, or bit rate, or switching to mud pulse.

If the well 310 is vertical initially, then the straightening portions of the method 200 may be omitted. In addition, number of equivalent electrical (e.g., current) sources may be optimized through solving an inverse problem to reduce the computational time. In at least one embodiment, the user may aggregate each of the current segments when summing up the dipole responses in the 1D EM code.

Computation of Deep Electrode Signal in a Steel-Cased Well

As mentioned earlier, the use of steel-cased DE well adds another layer of complexity to the existing 3D modeling. To make the computation of a DE signal practical, two approaches may be used.

DE Approach 1—An Approximate Solution

The first approach is based upon the assumption that the electrical current flowing in a steel-cased well is larger than the electrical current flowing in its counterpart in an open well (i.e., with no casing). This is because the conductivity contrast between a steel-cased well and its background formation is relatively large (e.g., at least six orders of magnitude). In other words, the ratio between the casing current and the background current may be close to a constant. This may be true when looking at the numerical results from 3D COMSOL® modeling, especially for the casing currents not close to the gap source, as discussed below.

Figure 4:
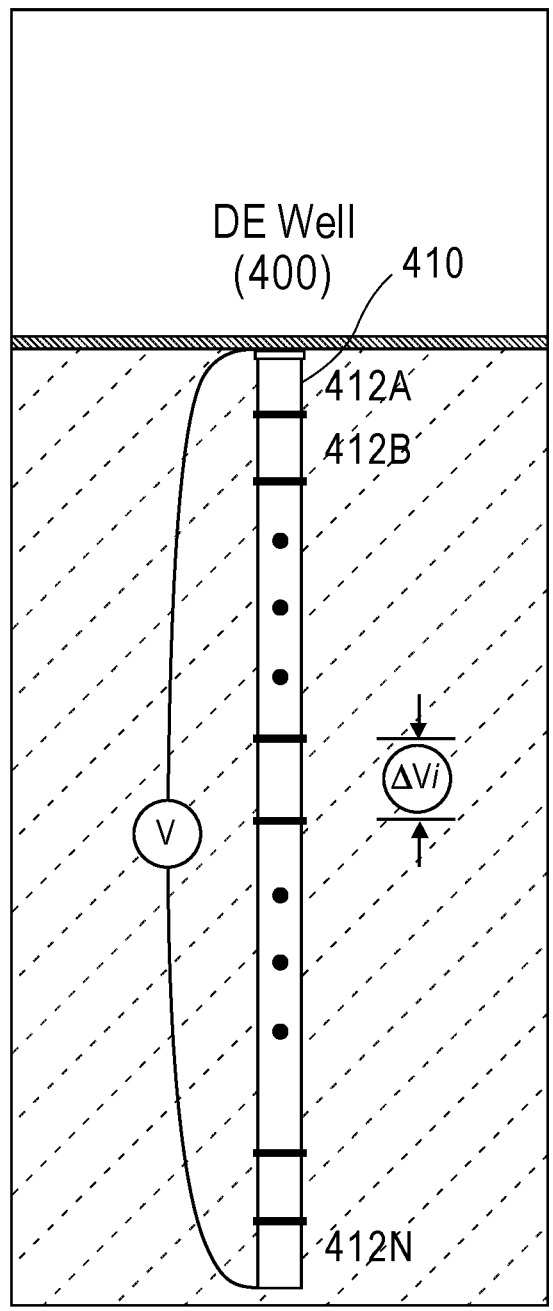
FIG. 4 illustrates a schematic view of a DE cased well, according to an embodiment.

FIG. 4 illustrates a schematic view of a DE cased well 400, according to an embodiment. The well 400 may have a metallic (e.g., steel) casing 410 positioned therein. The casing 410 may include one or more (e.g., a plurality of) segments 412-1-412-N. One or more formulas may be used to compute the DE signal from the background model in which there is no DE well.

$$DE_V = \sum_{i=1}^{N} \Delta V_i \quad \text{Equation (1)}$$

$$\Delta V_i = I_i * R_i \quad \text{Equation (2)}$$

$$I_i = J_1 * \Delta A_i \quad \text{Equation (3)}$$

$$J_i = \alpha * \sigma_{0i} * E_{0i} \quad \text{Equation (4)}$$

In the formulas, $DE_V$ represents the total voltage measured at DE well, $\Delta V_i$ represents the i-th voltage in the DE well, n represents the summation index which goes from 1 to N, N represents the total number of segments in the DE well, $I_i$ represents the i-th current in segment i, $R_i$ represents the resistance of segment i, $J_i$ represents the current density at segment i, $\Delta A_i$ represents the cross-sectional area of segment i, $\alpha$ represents the casing factor (e.g., a function of conductivity, frequency, and/or geometry), $\sigma_{0i}$ represents the conductivity of the background (e.g., of the formation), and $E_{0i}$ represents the vertical electrical field in the background.

Given the resistance of the DE cased well 400, the cross-section area, as well as the casing factor, which is close to 500 from numerical experiments, the DE signal can be estimated using equations (1)-(4). The background EM fields can be obtained by running CWNLAT if the well is a vertical drilling well, or by summing up the equivalent electrical (e.g., current) sources, if the well is a curved well.

DE Approach 2—A More Rigorous Solution

Figure 5:
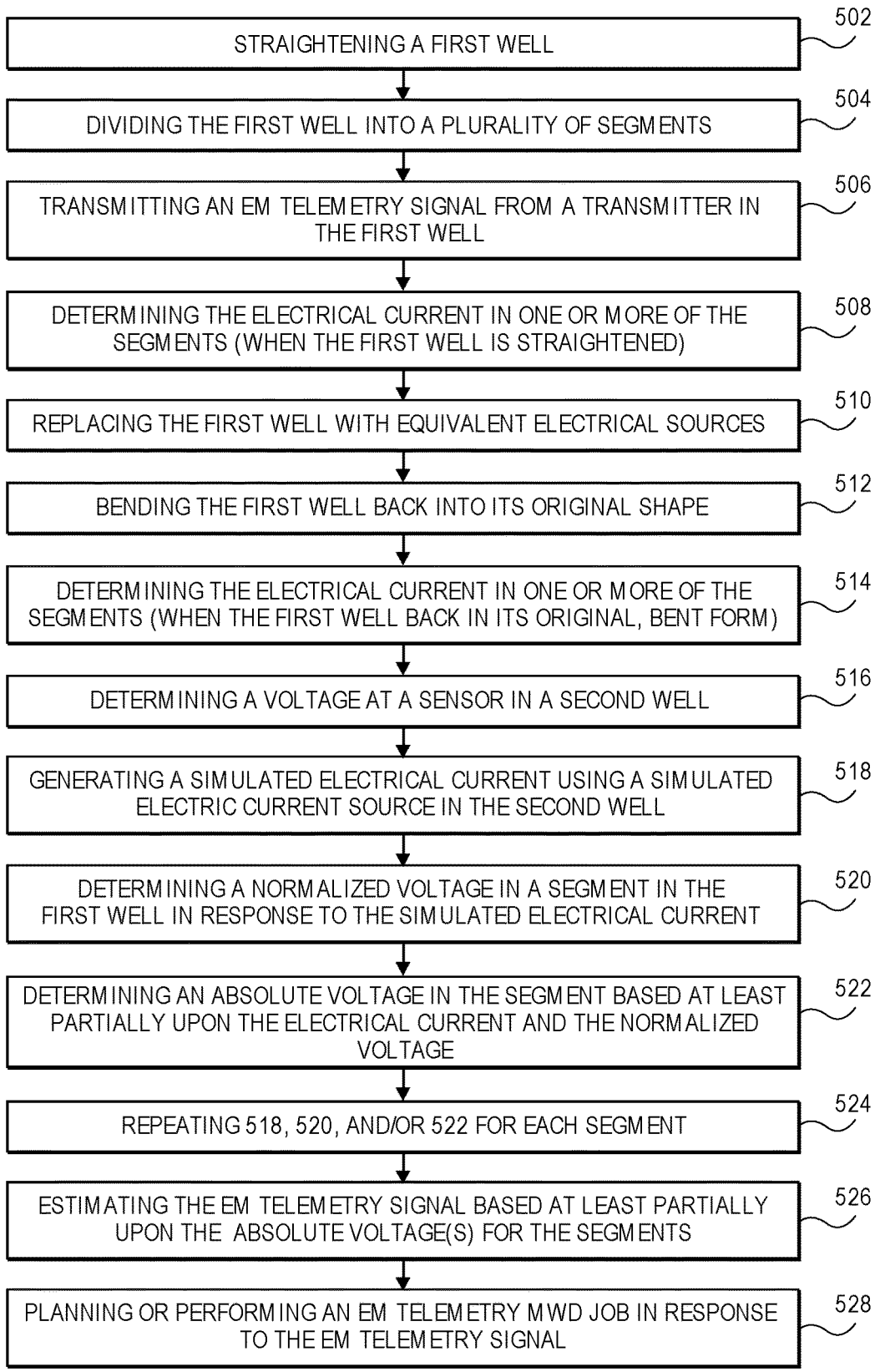
FIG. 5 illustrates a flowchart of a method for predicting an EM signal transmitted from a curved drilling well using equivalent electrical (e.g., current) sources, according to an embodiment.

A more rigorous solution may involve combining the equivalent electrical (e.g., current) sources with EM reciprocity to handle both the drilling well and the DE cased well. FIG. 5 illustrates a flowchart of a method 500 for measuring an EM signal transmitted from a curved drilling well using equivalent electrical (e.g., current) sources, according to an embodiment. FIGS. 6A-6D illustrate portions of the method 500.

Figure 6A:
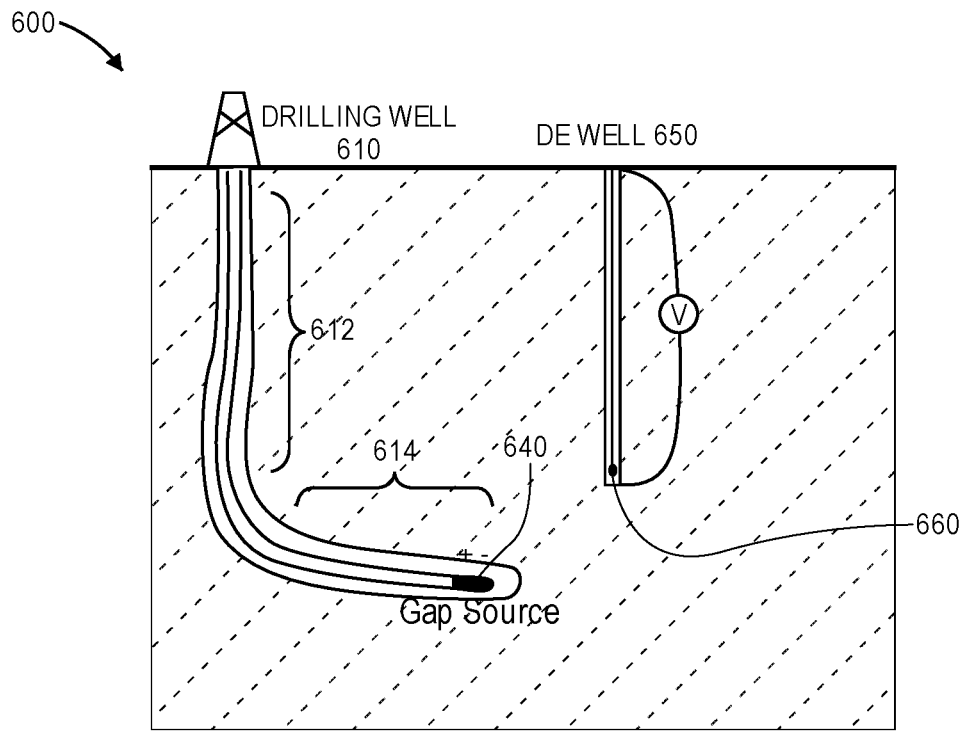
FIG. 6A illustrates a schematic view of a wellsite including a first (e.g., drilling) well and a second (e.g., DE) well, according to an embodiment.

FIG. 6A illustrates a schematic view of a wellsite 600 with a first (e.g., curved, drilling) well 610 including a first portion 612 and a second portion 614, according to an embodiment. The wellsite in FIGS. 6A-6D may be similar to the wellsite 300 in FIGS. 3A-3D, except that the wellsite 600 may also include a second (e.g., DE) well 650 adjacent to the first well 610. The second well 650 may include a metallic (e.g., steel) casing. The second well 650 may include a DE sensor 660 positioned therein. The DE sensor 660 may be positioned proximate to a lower end of the second well 650. The DE sensor 660 may be positioned vertically above, vertically below, or vertically aligned with the transmitter 644 of the downhole tool 640 in the first well 610.

At least a portion of the method 500 may be similar to the method 200 described above. As such, some of the details that have been described above may apply to the method 500, but are omitted here to avoid redundancy. The method 500 may include straightening the first well 610, as at 502. The method 500 may also include dividing the first well 610 into a plurality of segments, as at 504. The method 500 may also include transmitting an EM signal from the transmitter 644 in the first well 610, as at 506. The EM transmitter 644 may generate an electrical current in the first well 610 (e.g., in the segments). The method 500 may also include determining the electrical current in one or more (e.g., each of the) segments, as at 508.

Figure 6B:
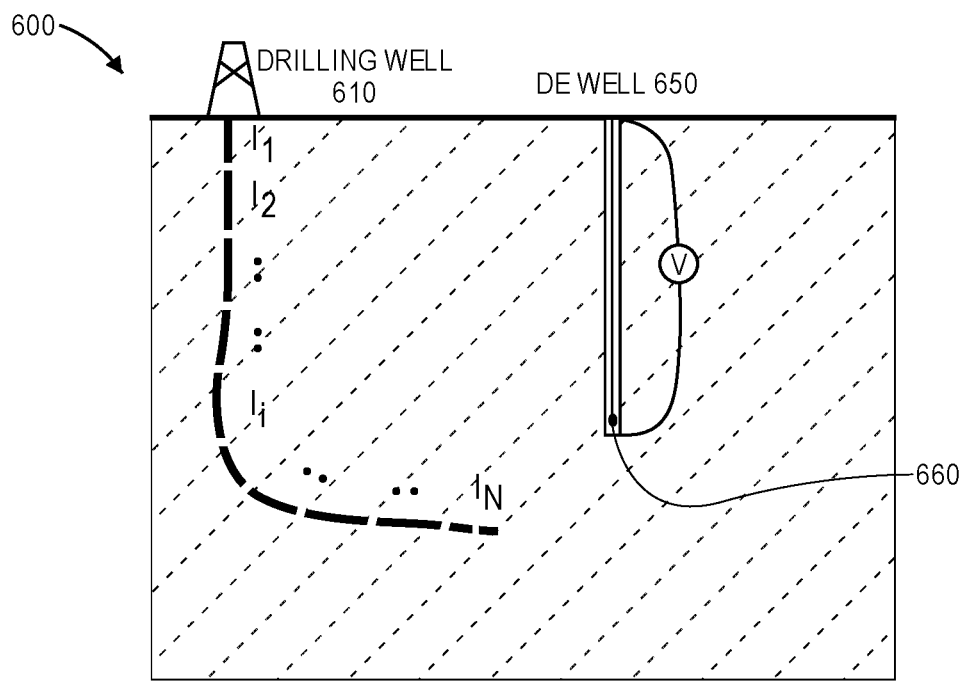
FIG. 6B illustrates a schematic view of the first well being replaced with equivalent electrical (e.g., current) sources, according to an embodiment.

The electrical current in each segment may be equivalent to an electrical current source from an electromagnetic point of view. As such, once the electrical current in the segments has been determined, the method 500 may also include replacing the first well 610 (e.g., the segments) with equivalent electrical (e.g., current) sources $I_1$-$I_N$, as at 510. This is shown in FIG. 6B. As mentioned above, the equivalent electrical (e.g., current) sources may be electric dipoles. In at least one embodiment, one equivalent electrical (e.g., current) source may correspond to one segment (e.g., segment 344A).

The method 500 may also include bending the first well 610 back into its original shape, as at 512. Bending the first well 610 may include bending the segments and/or the equivalent electrical (e.g., current) sources. The method 500 may also include determining the electrical current in one or more (e.g., each of the) segments (e.g., after the first well 610 is bent back into its original shape), as at 514. The electrical current in the segments may be determined by projection, as discussed above.

The method 500 may also include determining a voltage $V^{DE}$ at the DE sensor 660 in the second well 650, as at 516. The voltage $V^{DE}$ may be determined by adding/summing each current segment (i.e., the electrical current in each segment determined at 508 and/or 514). For example, the voltage $V^{DE}$ may be determined using equation (5):

$$V^{DE} = \sum_{i=1}^{N} V_{I_i}^{DE} \quad \text{Equation (5)}$$

where $V_{I_i}^{DE}$ represents the voltage measured at DE well due to the i-th current segment $I_i$ in the drilling well, i represents the summation index, and N represents the total number of segments. Here, the summation is over each current segment in the first well 610. It may be difficult to directly obtain $V_{I_i}^{DE}$, which may involve another full 3D modeling. Here, the index $I_i$ represents the source location, and DE is the receiver location.

In at least one embodiment, an artificial (i.e., simulated) electrical current source may be positioned in the second (e.g., DE) well 650. The electrical current source may be a mathematical tool to implement the EM reciprocity. Thus, an actual electrical current source may not be positioned in the second well 650. Rather, the electrical current source may be introduced by the processor running the code. The electrical current source may be configured to generate a predetermined artificial (i.e., simulated) electrical current (e.g., 1 amp). As such, the method 500 may also include generating an artificial electrical current using the artificial electric current source in the second well 650, as at 518. The method 500 may also include determining a normalized voltage in/over a segment (e.g., segment $I_i$) in the first (e.g., curved, drilling) well 610 in response to the artificial electrical current, as at 520. The normalized voltage may be determined using the processor running the code (e.g., CWNLAT). As used herein, a normalized voltage refers to the voltage (Volt) generated by the artificial electrical current, and divided by the artificial current strength (1 Amp), resulting the normalized voltage with a unit of V/A.

Figure 6C:
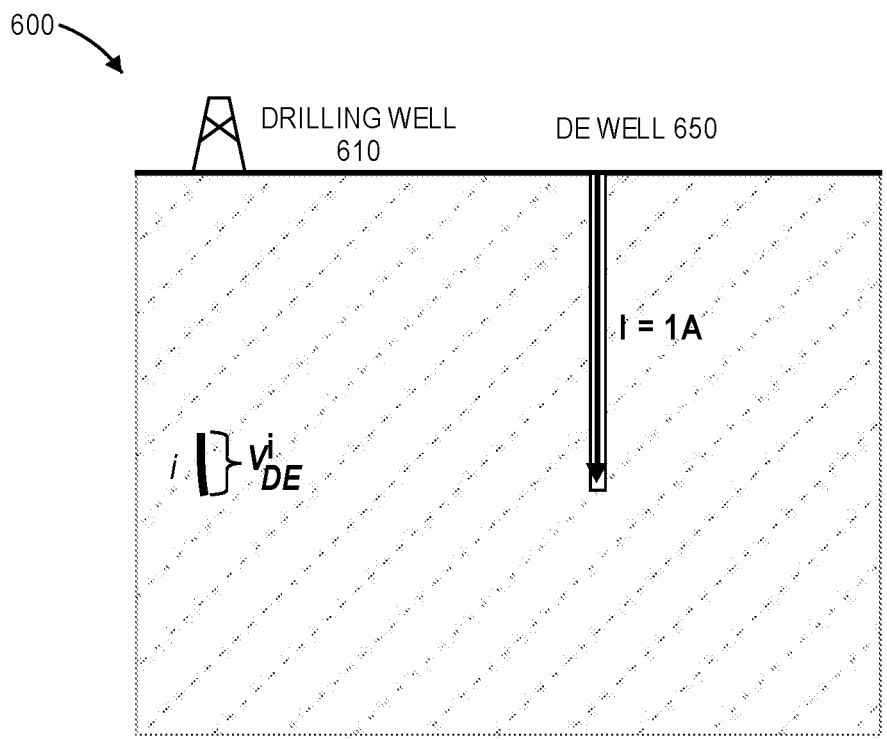
FIG. 6C illustrates a schematic view of a normalized voltage of the first well, generated by the artificial current source in the second well, according to an embodiment.

According to EM reciprocity, the normalized voltage in/over the segment (e.g., segment I) in the first (e.g., curved, drilling) well 610 is the same as the normalized voltage in/over the second (e.g., DE) well 650, when the predetermined artificial current is applied (e.g., to the i-segment). This is shown in FIG. 6C. Thus, $$V_i^{DE} = V_{DE}^i \quad \text{Equation (6)}$$

$$V_{I_i}^{DE} = I_i * V_i^{DE} \quad \text{Equation (7)}$$

where $V_i^{DE}$ represents the segment voltage measured at the DE well due to a source at i-th segment (1 Amp) in the drilling well, $V_{DE}^i$ represents the normalized voltage measured at i-th segment in the drilling well due to the DE with an artificial source (e.g., 1 Amp), and $I_i$ represents the actual current strength at i-th segment.

Figure 6D:
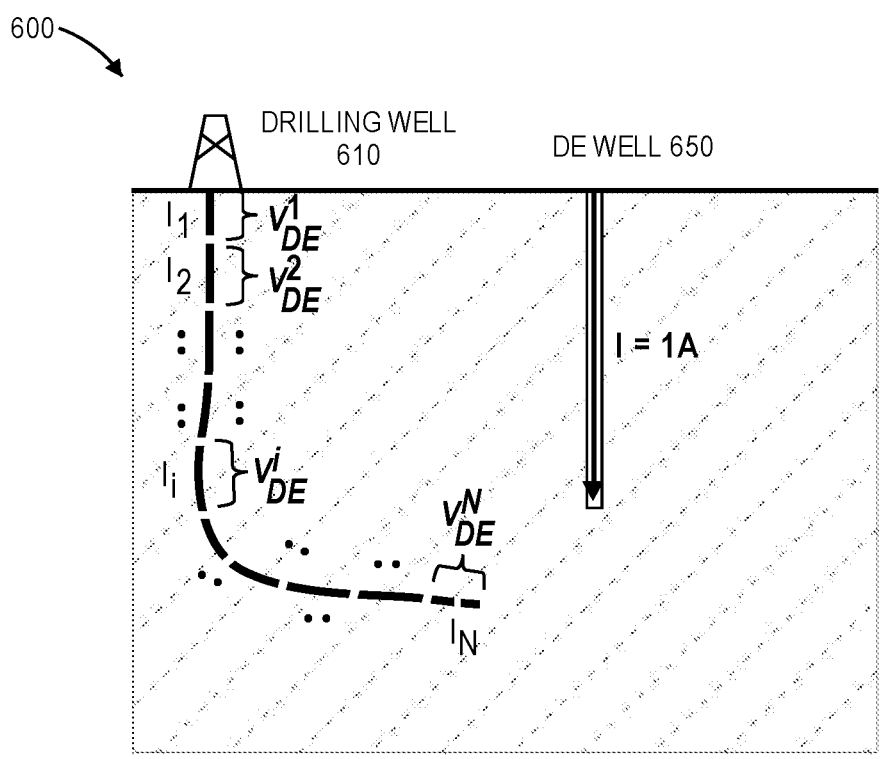
FIG. 6D illustrates a schematic view of a plurality of normalized voltage of the first well, generated by the artificial current source in the second well, according to an embodiment.

The method 500 may also include determining a segment voltage in the segment (e.g., segment $I_i$) based at least partially upon the normalized voltage, as at 522. This may include multiplying the electrical current in the segment (e.g., segment $I_i$; obtained at 508 and/or 514) with its corresponding normalized voltage (e.g., obtained at 520) to produce the segment voltage corresponding to this current segment (e.g., segment $I_i$). As used herein, a segment voltage refers to the voltage (V) after multiplying the current (A) with the normalized voltage (V/A). The method 500 may also include repeating 518, 520, and/or 522 for each segment, as at 524. The method 500 may also include estimating the EM signal based at least partially upon the segment voltage(s) for the one or more segments, as at 526. This may include adding/summing the segment voltages for the segments to estimate the EM signal amplitude in the second (e.g., DE) well 650. This is shown in FIG. 6D and Equation (8) below:

$$V^{DE} = \sum_{i=1}^{N} I_i * V_i^{DE} \quad \text{Equation (8)}$$

This may be similar to 516 above. For example, the summation here is also over each current segment in the first well 610. However, using the EM reciprocity, the same results may be obtained without directly solving for $V_{I_i}^{DE}$. Instead:

$$V_{I_i}^{DE} = I_i * V_i^{DE} = I_i * V_{DE}^i \quad \text{Equation (9)}$$

Here, it may be seen that the current $I_i$ is the segment current (obtained earlier in the method 500), and is the normalized voltage over the segment due to the artificial electrical current source in the second well 650. Thus, Equation (9) may be computed with the artificial DE source.

The method 500 may also include planning or performing an EM telemetry measurement-while-drilling (MWD) job in response to the EM signal amplitude, as at 528. The EM telemetry MWD job may be or include those described above.

Preliminary Results

Test 1: Equivalent Sources in a Vertical Well

Figures 7A, 7B:
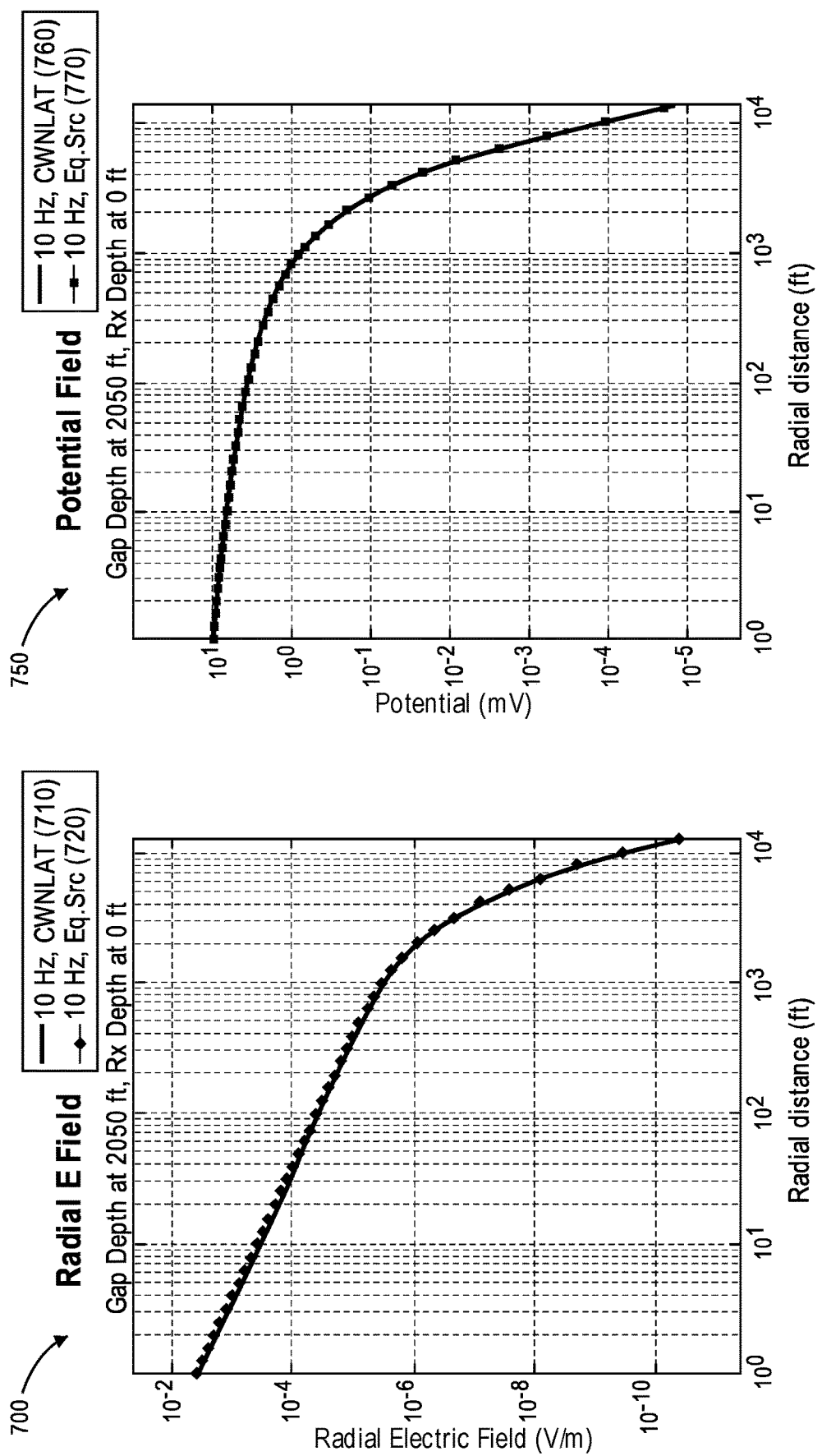
FIG. 7A illustrates a graph showing a radial electric field.
FIG. 7B illustrates a graph showing a potential field, according to an embodiment.

FIG. 7A illustrates a graph 700 showing a radial electric field, and FIG. 7B illustrates a graph 750 showing a potential field, according to an embodiment. The radial electric field and potential field are obtained at the surface using the equivalent source method(s) 200, 500 described above and running CWNLAT. To validate the equivalent source method(s) 200, 500 to replace a drill string in a vertical well, a 2D model can be used. The drill string, with an outer diameter (OD) of 5.0 inches, can be positioned in a uniform half-space of formation with a resistivity of 10 Ωm. In this example, there is no drilling mud and no casing shoe, to simplify the problem. For a gap source at 2050 ft, and at 10 Hz, both the radial electric fields and potentials at the surface, computed using CWNLAT, are plotted as lines 710, 760 in FIGS. 7A and 7B, respectively. In comparison, the electric fields and potentials computed from the equivalent sources by running EM1D are plotted out in dotted lines 720, 770 in FIGS. 7A and 7B, respectively. As may be seen, except for the stakes less than a few feet from the drilling well, both electric fields and potentials are in good agreement. This confirms that it is feasible to replace a drilling well with multiple equivalent sources in a 3D EM modeling.

Test 2: DE Approximate Solution Against COMSOL®

The second test compares the DE approximation solution against 3D COMSOL® modeling for a 3D model. The input parameters of the model may include formation resistivity, mud resistivity, frequency, contact point at surface between casing and drill string, the casing down to a predetermined depth, the gap sources, the drill string segments, the deep electrode casing, or a combination thereof. In this particular test, the formation resistivity is uniform at 10 Ωm; the mud (e.g., brine) resistivity is 0.1 Ωm and oil-based mud (OBM) resistivity 40,000 Ωm; the frequency is 10 Hz; the contact point at the surface between the casing and the drill string segments over 3 feet is 1 Ωm; the casing extends downward about 200 feet from the surface, the gap sources are at about 935 feet, 1935 feet, 2935 feet, and 4135 feet; the drill string segments have an inner diameter (ID) of about 3.75 inches and an OD of about 4.5 inches, and the deep electrode casing is about 4200 feet deep and includes a 1 foot radius cylinder with 2e-7 Ωm resistivity.

Figure 8:
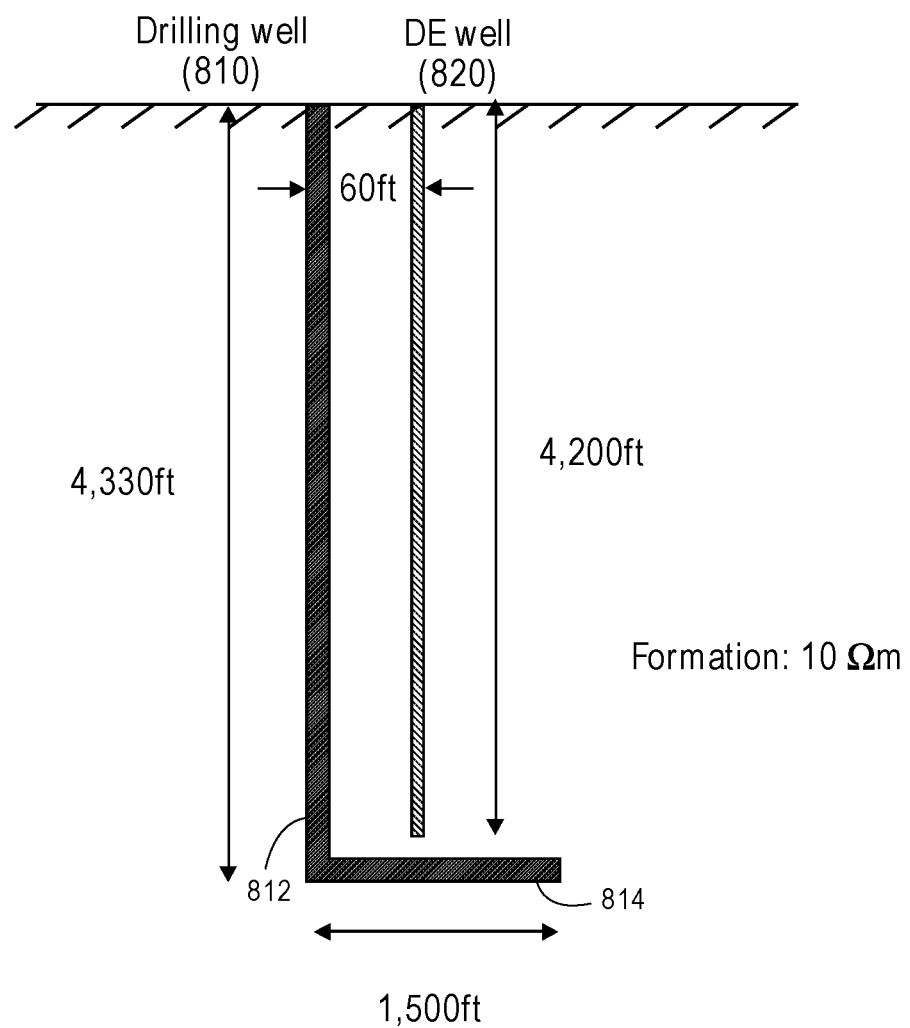
FIG. 8 illustrates a schematic view of a first (e.g., drilling) well and a second (e.g., DE cased) well that are part of a test, according to an embodiment.

FIG. 8 illustrates a schematic view of a first (e.g., drilling) well 810 and a second (e.g., DE cased) well 820 that are part of Test 2, according to an embodiment. As shown, the first well 810 includes a substantially vertical portion 812 and a substantially horizontal portion 814, and the second well 820 is substantially vertical. In addition, drilling fluids (e.g., WBM and/or OBM), casing shoes, surface contact points, are included in this 3D model. As a result, in theory, a user cannot run CWNLAT to obtain the DE signal for this model. Instead, 3D COMSOL may be run over cluster machines, but a gap source may take 6 hours over 10 nodes.

Figures 9A, 9B:
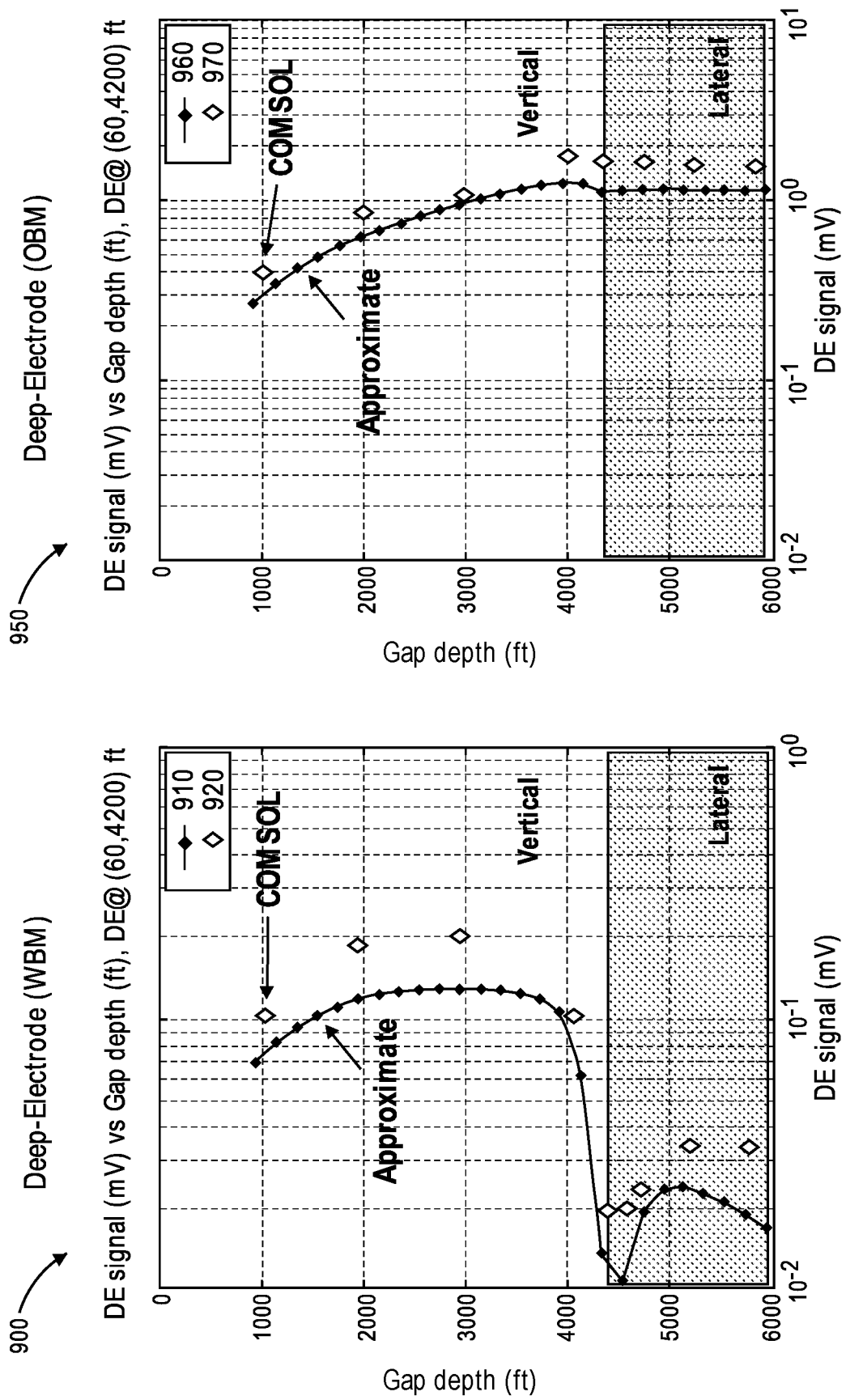
FIGS. 9A and 9B illustrate graphs showing a DE signal obtained from running a program (e.g., 3D COMSOL®) and a DE approach, according to an embodiment.

FIGS. 9A and 9B illustrate graphs 900, 950 showing a DE signal obtained from running 3D COMSOL® and the DE approach 2 described above (e.g., in method 500), according to an embodiment. The graph 900 is for WBM having a resistivity of 0.1 Ωm, and the graph 950 is for OBM having a resistivity of 40,000 Ωm. Using the DE approach 2 described above (e.g., in method 500), the DE signal can be estimated. As an example, the user can run CWNLAT to determine the background electric fields, and then to calculate the DE voltage. The estimated DE signals for both WBM and OBM are shown in dotted lines 910, 960 in FIGS. 9A and 9B, respectively. The diamonds (920 for WBM and 970 for OBM) from 3D COMSOL runs are also plotted out. Generally, the comparison is reasonable, the difference being less than 2 times, except for the gap depth 4135 ft with WBM in graph 900. The reason for a larger offset at this case is because the bottom of the DE well (4200 ft) is almost at the same depth as the gap source (4135 ft), and the distance between these two wells is only 60 ft. The background field around the gap source usually changes rapidly. This can be seen from the curve on the left panel in FIG. 9A as well.

Test 3: Surface Stake Approximate Solution Against COMSOL®

Figure 10:
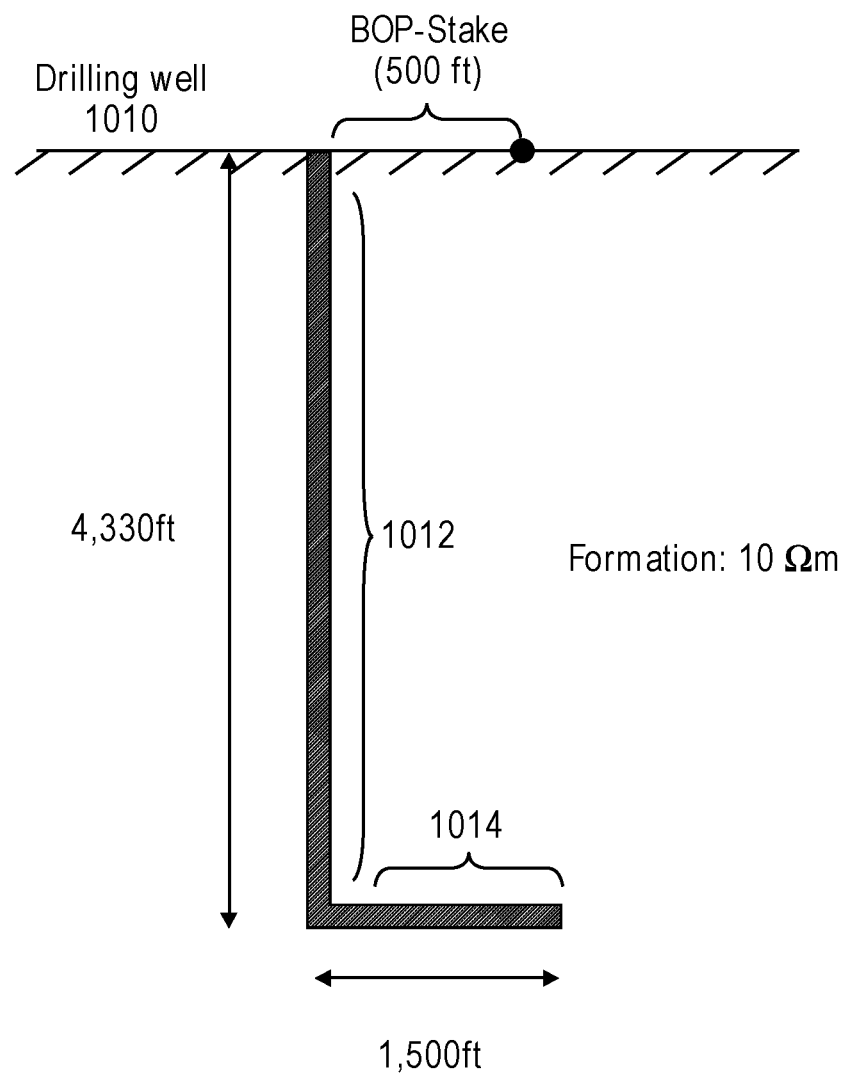
FIG. 10 illustrates a schematic view of a drilling well, according to an embodiment.
Figure 11:
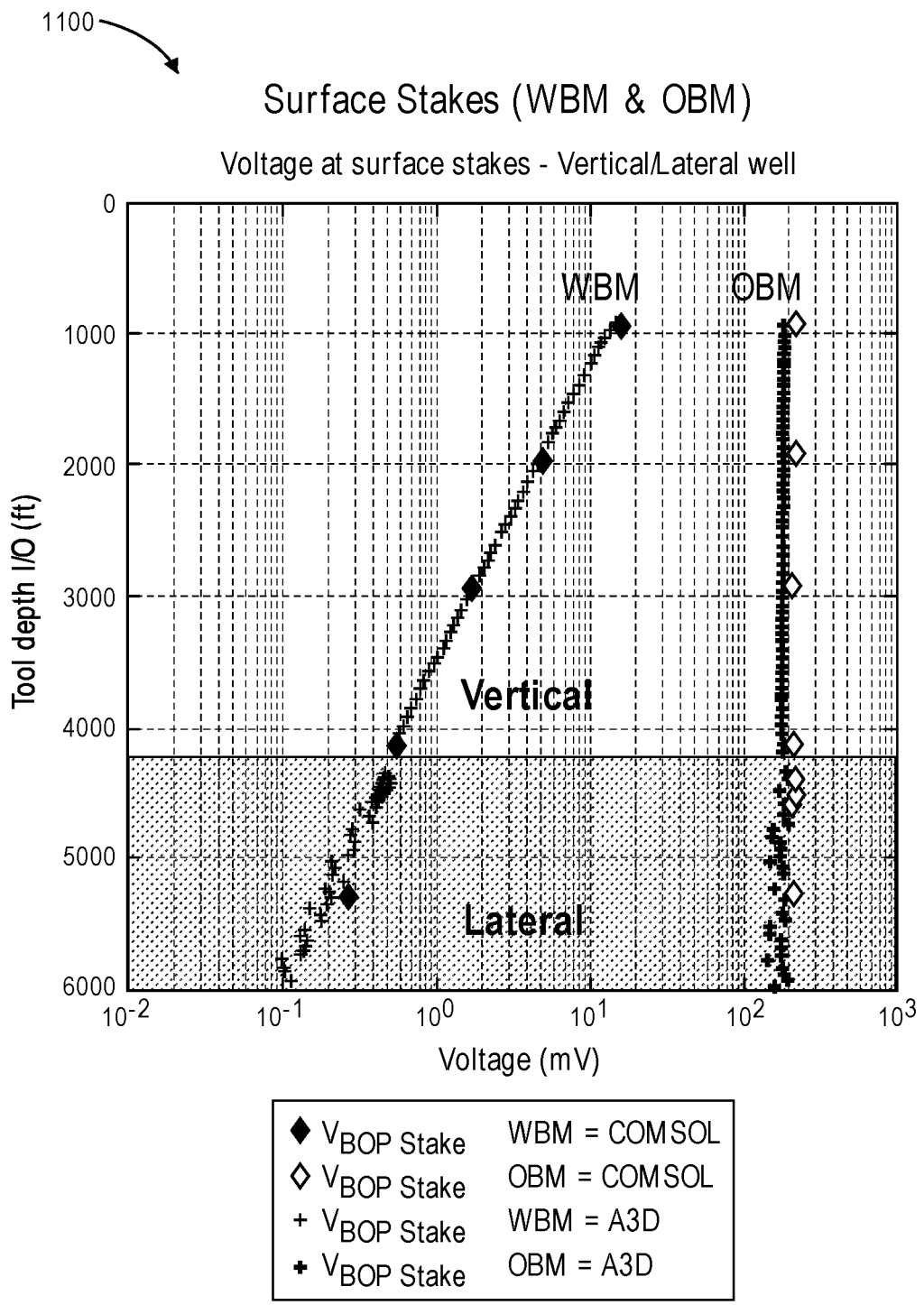
FIG. 11 illustrates a graph showing comparisons of surface stake signals obtained from running 3D COMSOL® and a 3D approximation method, according to an embodiment.

Similar to Test 2, Test 3 shows comparison results for surface stakes. FIG. 10 illustrates a schematic view of a drilling well 1010, according to an embodiment. As shown, the drilling well 1010 includes a substantially vertical portion 1012 and a substantially horizontal portion 1014. FIG. 11 illustrates a graph 1100 showing comparisons of surface stake signals obtained from running 3D COMSOL® and the 3D approximation method 200, 500, according to an embodiment. As may be seen in the graph 1100, with both WBM and OBM and in both vertical and lateral sections, the approximation 3D solutions match reasonably well with the 3D COMSOL® results.

The methods 200, 500 described herein may be used for EM telemetry transmission applications involving one or more wells in a megapad, for EM telemetry in offshore applications, for hydraulic fracking monitoring applications, for underground EM communication applications, and the like.

Figure 12:
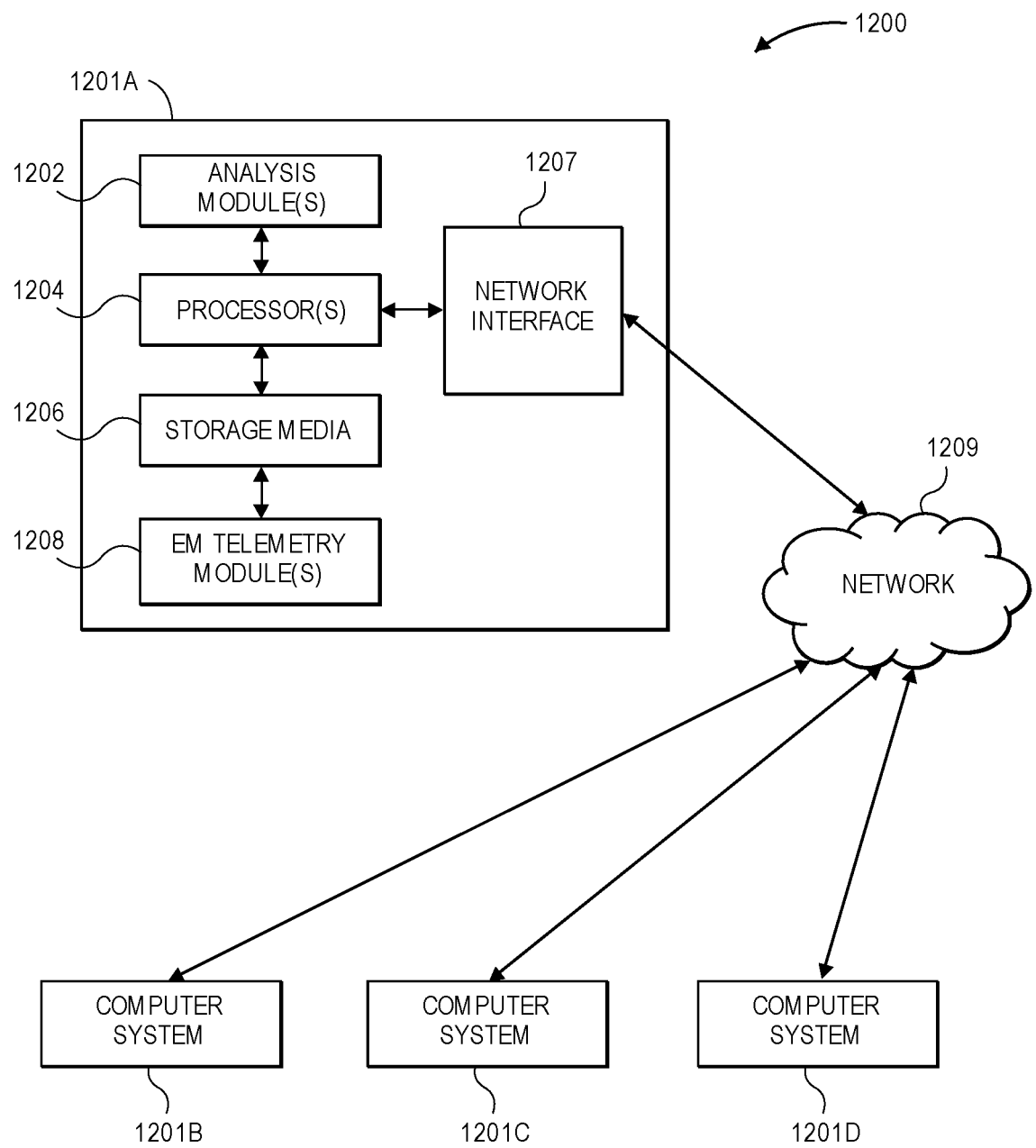
FIG. 12 illustrates a schematic view of a computing or processor system for performing at least a portion of the method(s), according to an embodiment.

FIG. 12 illustrates a schematic view of a computing or processor system for performing the method, according to an embodiment. The computing system 1200 may include a computer or computer system 1201A, which may be an individual computer system 1201A or an arrangement of distributed computer systems. The computer system 1201A includes one or more analysis modules 1202 that are configured to perform various tasks according to some embodiments, such as one or more methods disclosed herein. To perform these various tasks, the analysis module 1202 executes independently, or in coordination with, one or more processors 1204, which is (or are) connected to one or more storage media 1206. The processor(s) 1204 is (or are) also connected to a network interface 1207 to allow the computer system 1201A to communicate over a data network 1209 with one or more additional computer systems and/or computing systems, such as 1201B, 1201C, and/or 1201D (note that computer systems 1201B, 1201C and/or 1201D may or may not share the same architecture as computer system 1201A, and may be located in different physical locations, e.g., computer systems 1201A and 1201B may be located in a processing facility, while in communication with one or more computer systems such as 1201C and/or 1201D that are located in one or more data centers, and/or located in varying countries on different continents).

A processor can include a microprocessor, microcontroller, processor module or subsystem, programmable integrated circuit, programmable gate array, or another control or computing device.

The storage media 1206 can be implemented as one or more computer-readable or machine-readable storage media. Note that while in some example embodiments of FIG. 12 storage media 1206 is depicted as within computer system 1201A, in some embodiments, storage media 1206 may be distributed within and/or across multiple internal and/or external enclosures of computing system 1201A and/or additional computing systems. Storage media 1206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1200 contains one or more EM telemetry module(s) 1208. In the example of computing system 1200, computer system 1201A includes the EM telemetry module 1208. In some embodiments, a single EM telemetry module may be used to perform at least some aspects of one or more embodiments of the method(s) 200, 500 disclosed herein. In alternate embodiments, a plurality of EM telemetry modules may be used to perform at least some aspects of method(s) 200, 500 disclosed herein.

It should be appreciated that computing system 1200 is but one example of a computing system, and that computing system 1200 may have more or fewer components than shown, may combine additional components not depicted in the example embodiment of FIG. 12, and/or computing system 1200 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

Geologic interpretations, models and/or other interpretation aids may be refined in an iterative fashion; this concept is applicable to methods as discussed herein. This can include use of feedback loops executed on an algorithmic basis, such as at a computing device (e.g., computing system 1200, FIG. 12), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A method for modeling an electromagnetic (EM) telemetry signal, comprising:
    straightening a well in a model;
    dividing the well into a plurality of segments;
    determining an electrical current in one or more of the plurality of segments when the well is straightened;
    replacing the well with equivalent electrical sources based at least partially upon the electrical current in the one or more of the plurality of segments;
    bending the well back into its original shape in the model;
    determining an electrical current in the one or more of the plurality of segments by projection when the well is back in its original shape; and
    summing EM fields for each of the one or more of the plurality of segments, based at least partially upon the electrical current in the one or more of the plurality of segments when the well is back in its original shape, to estimate the EM telemetry signal.

2. The method of claim 1, wherein the well is substantially vertical when straightened.

3. The method of claim 1, further comprising simulating the EM telemetry signal from a transmitter in the well, which generates the electrical current in the one or more of the plurality of segments when the well is straightened.

4. The method of claim 1, wherein the equivalent electrical sources comprise electric dipoles.

5. The method of claim 1, wherein the electrical current in the one or more of the plurality of segments when the well is back in its original shape is determined based at least partially upon an azimuthal angle, an inclination angle, or both for the one or more of the plurality of segments when the well is back in its original shape.

6. The method of claim 1, further comprising performing an EM telemetry measurement-while-drilling (MWD) job in response to the estimated EM telemetry signal.

7. A method for modeling an electromagnetic (EM) telemetry signal, comprising:
    replacing a first well with equivalent electrical sources in a model;
    determining an electrical current in one or more segments in the first well based at least partially upon the equivalent electrical sources;
    generating a simulated electrical current in a second well;
    determining a normalized voltage in the one or more segments in the first well in response to the simulated electrical current in the second well;
    determining a segment voltage in the one or more segments in the first well based at least partially upon the electrical current of the one or more segments in the first well and the normalized voltage of the one or more segments in the first well; and
    estimating the EM telemetry signal from a transmitter in the first well based at least partially upon the segment voltages of the one or more segments in the first well.

8. The method of claim 7, wherein replacing the first well with the equivalent electrical sources in the model comprises:
    straightening the first well in the model;
    dividing the first well into the one or more segments; and
    determining the electrical current in the one or more of the segments in the first well when the first well is straightened.

9. The method of claim 8, wherein electrical currents in the equivalent electrical sources are determined in the one or more of the segments in the first well when the first well is straightened.

10. The method of claim 8, wherein replacing the first well with the equivalent electrical sources in the model further comprises:
    bending the first well back into its original shape in the model; and
    determining an electrical current in the one or more of the segments in the first well by projection when the first well is back in its original shape.

11. The method of claim 7, wherein determining the segment voltage in the one or more segments in the first well comprises multiplying the electrical current in the one or more segments in the first well by the normalized voltage in the one or more segments in the first well.

12. The method of claim 7, wherein estimating the EM telemetry signal comprises summing the segment voltages for the one or more segments in the first well.

13. The method of claim 7, wherein the EM telemetry signal is estimated at a sensor in the second well.

14. The method of claim 7, wherein the second well comprises a metallic casing.

15. The method of claim 7, wherein the equivalent electrical sources comprise electric dipoles.

16. The method of claim 7, further comprising drilling the first well in response to the estimated EM telemetry signal.

17. A computing system comprising:
    one or more processors; and
    a memory system comprising one or more non-transitory computer-readable media storing instructions that, when executed by at least one of the one or more processors, cause the computing system to perform operations, the operations comprising:
    replacing a first well with equivalent electrical sources in a model;
    determining an electrical current in one or more segments in the first well based at least partially upon the equivalent electrical sources;
    generating a simulated electrical current in a second well;
    determining a normalized voltage in the one or more segments in the first well in response to the simulated electrical current in the second well;

determining a segment voltage in the one or more segments in the first well based at least partially upon the electrical current of the one or more segments in the first well and the normalized voltage of the one or more segments in the first well; and estimating an electromagnetic (EM) telemetry signal from a transmitter in the first well based at least partially upon the segment voltages of the one or more segments in the first well.

18. The computing system of claim 17, wherein replacing the first well with the equivalent electrical sources in the model comprises:

straightening the first well in the model;

dividing the first well into the one or more segments;

determining the electrical current in the one or more of the segments in the first well when the first well is straightened;

bending the first well back into its original shape in the model; and determining an electrical current in the one or more of the segments in the first well by projection when the first well is back in its original shape.

19. The computing system of claim 17, wherein determining the segment voltage in the one or more segments in the first well comprises multiplying the electrical current in the one or more segments in the first well by the normalized voltage in the one or more segments in the first well.

20. The computing system of claim 17, wherein the operations further comprise performing an EM telemetry measurement-while-drilling (MWD) job in response to the estimated EM telemetry signal.

* * * * *